(12) United States Patent
Shirakawa et al.

(10) Patent No.: US 10,075,211 B2
(45) Date of Patent: Sep. 11, 2018

(54) CROSSTALK REDUCTION METHOD AND REPEATER

(71) Applicant: Hitachi Metals, Ltd., Tokyo (JP)

(72) Inventors: Yohei Shirakawa, Hitachi (JP); Koki Hirano, Hitachinaka (JP); Yoshitake Ageishi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 249 days.

(21) Appl. No.: 14/873,082

(22) Filed: Oct. 1, 2015

(65) Prior Publication Data
US 2016/0105214 A1 Apr. 14, 2016

(30) Foreign Application Priority Data

Oct. 8, 2014 (JP) ................................. 2014-207268

(51) Int. Cl.
*H04B 3/32* (2006.01)
*H04B 3/36* (2006.01)

(52) U.S. Cl.
CPC ................. *H04B 3/32* (2013.01); *H04B 3/36* (2013.01)

(58) Field of Classification Search
CPC ..................................... H04B 3/32; H04B 3/36
See application file for complete search history.

(56) References Cited

U.S. PATENT DOCUMENTS

| 7,561,625 B1 * | 7/2009 | Searles .................... H04B 3/32 375/257 |
| 8,403,709 B2 * | 3/2013 | Hammond, Jr. ..... H01R 13/719 439/676 |
| 2004/0100608 A1 | 5/2004 | Matsueda et al. |

(Continued)

FOREIGN PATENT DOCUMENTS

| JP | H 05-145388 A | 6/1993 |
| JP | 2004-152901 A | 5/2004 |

(Continued)

OTHER PUBLICATIONS

Japanese Office Action, dated Dec. 19, 2017, in Japanese Application No. 2014-207268 and English Translation thereof.

*Primary Examiner* — Jung H Park
*Assistant Examiner* — Chuong M Nguyen
(74) *Attorney, Agent, or Firm* — McGinn I.P. Law Group, PPLC

(57) ABSTRACT

A crosstalk reduction method includes providing a signal transmission unit including first to eighth main transmission paths, the first and second paths, the third and sixth paths, the fourth and fifth paths and the seventh and eighth paths being respectively paired to transmit differential signals, providing a first coupling transmission path in the signal transmission unit, the first coupling transmission path being adapted to electrically couple the third main transmission path to the fifth and seventh main transmission paths that are located adjacent to the sixth main path, and providing a second coupling transmission path in the signal transmission unit, (Continued)

the second coupling transmission path being adapted to electrically couple the sixth main transmission path to the second and fourth main transmission path that are located adjacent to the third main transmission path.

20 Claims, 1 Drawing Sheet

(56) References Cited

U.S. PATENT DOCUMENTS

| | | | |
|---|---|---|---|
| 2005/0018596 A1* | 1/2005 | Washburn | H04B 3/32 370/201 |
| 2006/0181459 A1* | 8/2006 | Aekins | H04B 3/32 343/700 MS |
| 2007/0117446 A1* | 5/2007 | Broyde | H04B 3/32 439/404 |
| 2010/0048040 A1 | 2/2010 | Straka et al. | |
| 2010/0093216 A1* | 4/2010 | Cohen | H01R 13/65807 439/607.31 |
| 2014/0226455 A1* | 8/2014 | Schumacher | H01R 13/6461 370/201 |

FOREIGN PATENT DOCUMENTS

| | | |
|---|---|---|
| JP | 2010-027437 A | 2/2010 |
| JP | 2012-500466 A | 1/2012 |
| WO | WO 2010/022231 A1 | 2/2010 |

* cited by examiner

CROSSTALK REDUCTION METHOD AND REPEATER

The present application is based on Japanese patent application No. 2014-207268 filed on Oct. 8, 2014, the entire contents of which are incorporated herein by reference.

BACKGROUND OF THE INVENTION

1. Field of the Invention

The invention relates to a crosstalk reduction method and a repeater.

2. Description of the Related Art

A repeater is known which is composed of an input-side connector, an output-side connector and a signal transmission unit connecting the two connectors so as to interconnect a communication cable connected to the input-side connector to another communication cable connected to the output-side connector.

Generally the communication cable has four pairs of transmission lines for transmitting differential signals and an 8-pin plug connector integrally provided at an end portion. Thus, 8-pin jack connectors are generally used as input-side and output-side connectors of repeaters.

The pinout for jack connectors used as the input-side and output-side connectors is standardized by TIA/EIA-568-B, etc., defined by American National Standards Institute, and pins 1 and 2 form a pair, as do 3 and 6, 4 and 5, and 7 and 8. The signal transmission unit of the repeater is configured to include first to eighth main transmission paths each connecting the pins having the same number of the two connectors.

JP-A-2010-27437 is a prior art document related to the invention.

SUMMARY OF THE INVENTION

The jack connectors have pins arranged at narrow intervals and may thus cause an increase in inter-pair crosstalk. According to an increase in communication speed in recent years, the prevention of crosstalk especially at a connector portion becomes a big problem.

Where the pins 1 and 2, 3 and 6, 4 and 5, and 7 and 8 are paired as described above, a problem may arise that the crosstalk is generated especially between the pair of pins 3 and 6 and the other pairs since the pins 3 and 6 are arranged away from each other.

It is an object of the invention to provide a crosstalk reduction method and a repeater that can prevent the inter-pair crosstalk.

(1) According to one embodiment of the invention, a crosstalk reduction method comprises:

providing a signal transmission unit comprising first to eighth main transmission paths, the first and second paths, the third and sixth paths, the fourth and fifth paths and the seventh and eighth paths being respectively paired to transmit differential signals;

providing a first coupling transmission path in the signal transmission unit, the first coupling transmission path being adapted to electrically couple the third main transmission path to the fifth and seventh main transmission paths that are located adjacent to the sixth main path; and providing a second coupling transmission path in the signal transmission unit, the second coupling transmission path being adapted to electrically couple the sixth main transmission path to the second and fourth main transmission path that are located adjacent to the third main transmission path.

In the above embodiment (1) of the invention, the following modifications and changes can be made.

(i) The method further comprises:

providing a third coupling transmission path in the signal transmission unit, the third coupling transmission path being adapted to electrically couple the third main transmission path to the eighth main transmission path located adjacent to the sixth main transmission path via the seventh main transmission path; and providing a fourth coupling transmission path in the signal transmission unit, the fourth coupling transmission path being adapted to electrically coupling the sixth main transmission path to the first main transmission path located adjacent to the third main transmission path via the second main transmission path.

(ii) The method further comprises:

providing a fifth coupling transmission path in the signal transmission unit, the fifth coupling transmission path being adapted to electrically couple the fourth main transmission path to the seventh main transmission path; and providing a sixth coupling transmission path in the signal transmission unit, the sixth coupling transmission path being adapted to electrically couple the fifth main transmission path to the second main transmission path.

(iii) Both ends of the third coupling transmission path are electrically connected to an input side and an output side, respectively, of the third main transmission path via a resistor.

(iv) Both ends of the fourth coupling transmission path are electrically connected to an input side and an output side, respectively, of the sixth main transmission path via a resistor.

(v) Both ends of the fifth coupling transmission path are electrically connected to an input side and an output side, respectively, of the fourth main transmission path via a resistor.

(vi) Both ends of the sixth coupling transmission path are electrically connected to an input side and an output side, respectively, of the fifth main transmission path via a resistor.

(2) According to another embodiment of the invention, a repeater comprises:

an input-side connector and an output-side connector each comprising eight pins used such that pins 1 and 2, 3 and 6, 4 and 5, and 7 and 8 are respectively paired to transmit differential signals; and a signal transmission unit comprising first to eighth main transmission paths each connecting the pins having a same number at the input-side connector and the output-side connector, wherein a communication cable connected to the input-side connector is connected through the repeater to another communication cable connected to the output-side connector, and wherein the signal transmission unit further comprises a first coupling transmission path adapted to electrically couple the third main transmission path to the fifth and seventh main transmission paths that are located adjacent to the sixth main path, and a second coupling transmission path adapted to electrically couple the sixth main transmission path to the second and fourth main transmission paths that are located adjacent to the third main transmission path.

In the above embodiment (2) of the invention, the following modifications and changes can be made.

(vii) The signal transmission unit further comprises a third coupling transmission path adapted to electrically couple the third main transmission path to the eighth main transmission path located adjacent to the sixth main transmission path via the seventh main transmission path, and a fourth coupling transmission path adapted to electrically couple the sixth main transmission path to the first main transmission path located adjacent to the third main transmission path via the second main transmission path.

(viii) The signal transmission unit further comprises a fifth coupling transmission path adapted to electrically couple the fourth main transmission path to the seventh main transmission path, and a sixth coupling transmission path adapted to electrically couple the fifth main transmission path to the second main transmission path.

(ix) Both ends of the third coupling transmission path are electrically connected to the pin 3 of the input-side connector and the output-side connector, respectively, via a resistor.

(x) Both ends of the fourth coupling transmission path are electrically connected to the pin 6 of the input-side connector and the output-side connector, respectively, via a resistor.

(xi) Both ends of the fifth coupling transmission path are electrically connected to the pin 4 of the input-side connector and the output-side connector, respectively, via a resistor.

(xii) Both ends of the sixth coupling transmission path are electrically connected to the pin 5 of the input-side connector and the output-side connector, respectively, via resistors.

Effects of the Invention

According an embodiment of the invention, a crosstalk reduction method and a repeater can be provided that can prevent the inter-pair crosstalk.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

An embodiment of the invention will be described below in conjunction with the appended drawings.

Figure 1A:
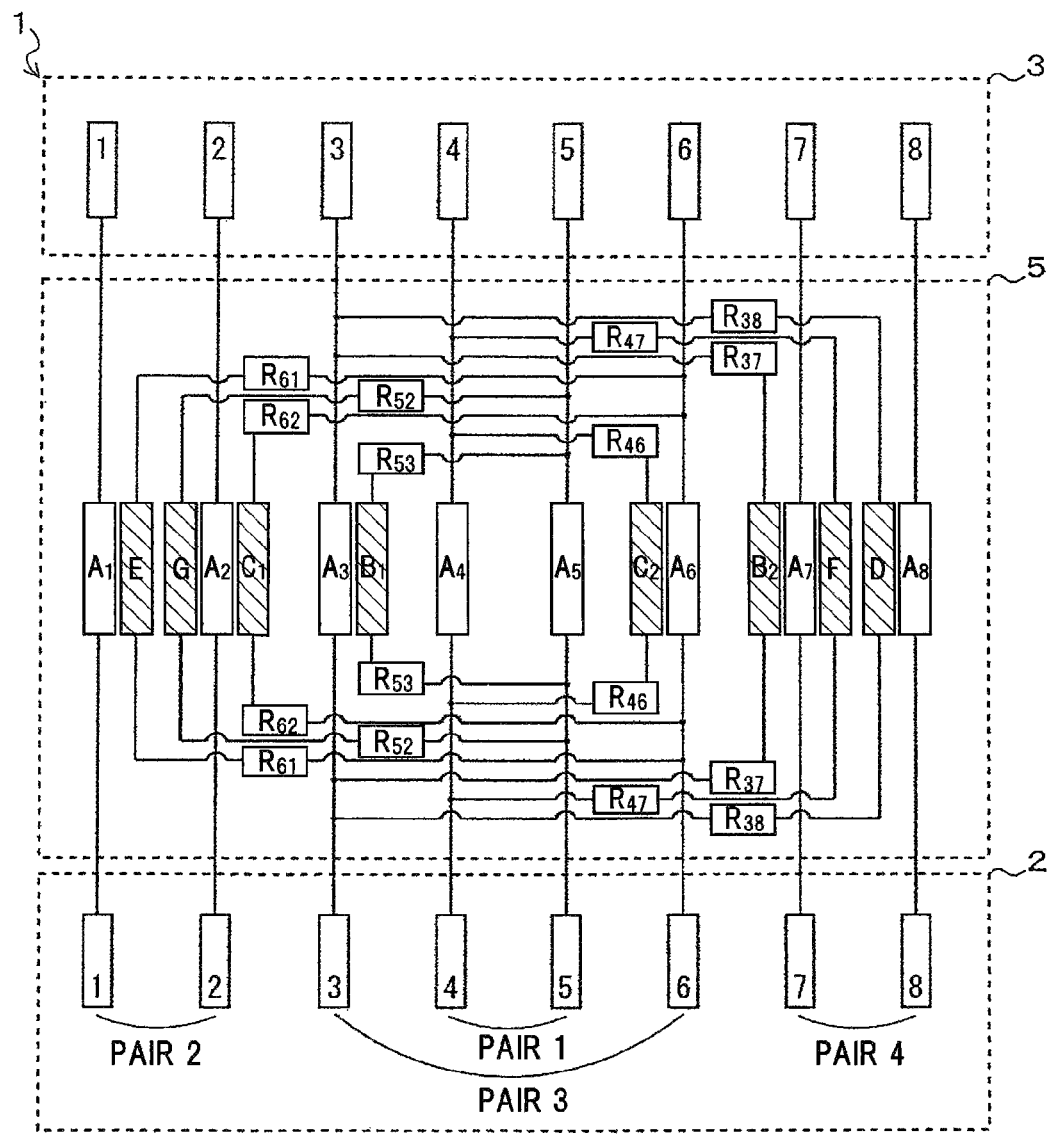
FIG. 1A is a circuit diagram showing a constructional example of a repeater in an embodiment of the invention.
Figure 1B:
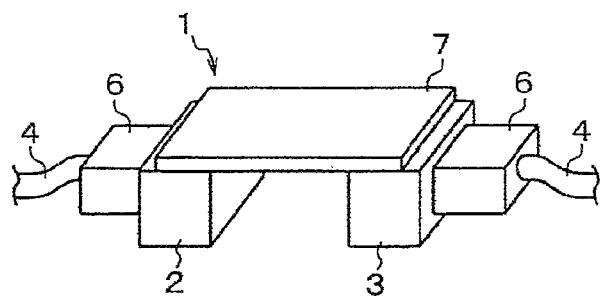
FIG. 1B is a perspective view showing the repeater.

FIG. 1A is a circuit diagram showing a constructional example of a repeater in an embodiment of the invention. FIG. 1B is a perspective view showing the repeater.

As shown in FIGS. 1A and 1B, a repeater 1 is provided with an input-side connector 2 and an output-side connector 3 each having eight pins used such that pins 1 and 2, 3 and 6, 4 and 5, and 7 and 8 are respectively paired to transmit differential signals, and a signal transmission unit 5 connecting the two connectors 2 and 3, and is used for connection between a communication cable 4 connected to the input-side connector 2 and another communication cable 4 connected to the output-side connector 3.

In the present specification, a connector on one side is referred to as input-side connector 2 and that on the other side as output-side connector 3 for convenience. However, "input" and "output" do not define signal transmission directions and signals can be bi-directionally transmitted between the input-side connector 2 and the output-side connector 3.

As the communication cable 4, it is possible to use a universal LAN (Local Area Network) cable. The communication cable 4 used in the present embodiment has four pairs of signal lines (eight in total) for transmitting differential signal. A connector 6 is integrally provided at an end of the communication cable 4. The connector 6 is, e.g., a plug connector conforming to the RJ45 standard (8P8C).

The input-side connector 2 and the output-side connector 3 are, e.g., jack connectors conforming to the RJ45 standard (8P8C) in which eight pins 1 to 8 are arranged in a row.

The pinout for the input-side connector 2 and the output-side connector 3 complies with, e.g., TIA/EIA-568-B defined by American National Standards Institute. The pins 4 and 5 are used as a first pair, the pins 1 and 2 as a second pair, the 3 and 6 as a third pair, and the pins 7 and 8 as a fourth pair.

The input-side connector 2 and the output-side connector 3 are mounted on a circuit board 7 on which the signal transmission unit 5 is mounted.

The signal transmission unit 5 is provided with first to eighth main transmission paths A1 to A8 each connecting the pins having the same number of the two connectors 2 and 3. As shown in FIG. 1A, in the signal transmission unit 5, the first to eighth main transmission paths A1 to A8 are sequentially arranged from left to right of the drawing. In FIG. 1A, rectangle boxes represent the transmission paths and solid lines represent electrical connection between transmission paths.

In the repeater 1 of the present embodiment, the signal transmission unit 5 is further provided with first coupling transmission paths B1 and B2 and second coupling transmission paths C1 and C2. The first coupling transmission paths B1 and B2 respectively electrically couple the third main transmission path A3 to the fifth and seventh main transmission paths A5 and A7 which are located adjacent to the sixth main path A6. The second coupling transmission paths C1 and C2 respectively electrically couple the sixth main transmission path A6 to the second and fourth main transmission paths A2 and A4 which are located adjacent to the third main transmission path A3.

The first coupling transmission path B1 is electrically connected to the pin 5 of the connector 2 at one end and to the pin 5 of the connector 3 at the other end (connected to both ends of the fifth main transmission path A5) via resistors R53, and is arranged adjacent to the third main transmission path A3. Thus, the transmission paths B1 and A3 are electrically coupled to each other so that the crosstalk is generated therebetween. The amount of crosstalk to be generated here can be adjusted by the resistors R53. Although the first coupling transmission path B1 is branched from the fifth main transmission path A5 and provided adjacent to the third main transmission path A3 in this case, the first coupling transmission path B1 may be branched from the third main transmission path A3 and provided adjacent to the fifth main transmission path A5.

The first coupling transmission path B2 is electrically connected to the pin 3 of the connector 2 at one end and to the pin 3 of the connector 3 at the other end (connected to both ends of the third main transmission path A3) via resistors R37, and is arranged adjacent to the seventh main transmission path A7. Thus, the transmission paths B2 and A7 are electrically coupled to each other so that the crosstalk is generated therebetween. The amount of crosstalk to be generated here can be adjusted by the resistors R37. Although the first coupling transmission path B2 is branched from the third main transmission path A3 and provided adjacent to the seventh main transmission path A7 in this case, the first coupling transmission path B2 may be branched from the seventh main transmission path A7 and provided adjacent to the third main transmission path A3.

The second coupling transmission path C1 is electrically connected to the pin 6 of the connector 2 at one end and to the pin 6 of the connector 3 at the other end (connected to both ends of the sixth main transmission path A6) via resistors R62, and is arranged adjacent to the second main transmission path A2. Thus, the transmission paths C and A2 are electrically coupled to each other so that the crosstalk is generated therebetween. The amount of crosstalk to be generated here can be adjusted by the resistors R62. Although the second coupling transmission path C1 is branched from the sixth main transmission path A6 and provided adjacent to the second main transmission path A2 in this case, the second coupling transmission path C1 may be branched from the second main transmission path A2 and provided adjacent to the sixth main transmission path A6.

The second coupling transmission path C2 is electrically connected to the pin 4 of the connector 2 at one end and to the pin 4 of the connector 3 at the other end (connected to both ends of the fourth main transmission path A4) via resistors R46, and is arranged adjacent to the sixth main transmission path A6. Thus, the transmission paths C2 and A6 are electrically coupled to each other so that the crosstalk is generated therebetween. The amount of crosstalk to be generated here can be adjusted by the resistors R46. Although the second coupling transmission path C2 is branched from the fourth main transmission path A4 and provided adjacent to the sixth main transmission path A6 in this case, the second coupling transmission path C2 may be branched from the sixth main transmission path A6 and provided adjacent to the fourth main transmission path A4.

The signal transmission unit 5 is further provided with a third coupling transmission path D for electrically coupling the eighth main transmission path A8 to the third main transmission path A3 and a fourth coupling transmission path E for electrically coupling the first main transmission path A1 to the sixth main transmission path A6.

The third coupling transmission path D is electrically connected to the pin 3 of the connector 2 at one end and to the pin 3 of the connector 3 at the other end (connected to both ends of the third main transmission path A3) via resistors R38, and is arranged adjacent to the eighth main transmission path A8. Thus, the transmission paths D and A8 are electrically coupled to each other so that the crosstalk is generated therebetween. The amount of crosstalk to be generated here can be adjusted by the resistors R38. Although the third coupling transmission path D is branched from the third main transmission path A3 and provided adjacent to the eighth main transmission path A8 in this case, the third coupling transmission path D may be branched from the eighth main transmission path A8 and provided adjacent to the third main transmission path A3.

The fourth coupling transmission path E is electrically connected to the pin 6 of the connector 2 at one end and to the pin 6 of the connector 3 at the other end (connected to both ends of the sixth main transmission path A6) via resistors R61, and is arranged adjacent to the first main transmission path A1. Thus, the transmission paths E and A1 are electrically coupled to each other so that the crosstalk is generated therebetween. The amount of crosstalk to be generated here can be adjusted by the resistors R61. Although the fourth coupling transmission path E is branched from the sixth main transmission path A6 and provided adjacent to the first main transmission path A1 in this case, the fourth coupling transmission path E may be branched from the first main transmission path A1 and provided adjacent to the sixth main transmission path A6.

The signal transmission unit 5 is further provided with a fifth coupling transmission path F for electrically coupling the fourth main transmission path A4 to the seventh main transmission path A7 and a sixth coupling transmission path G for electrically coupling the fifth main transmission path A5 to the second main transmission path A2.

The fifth coupling transmission path F is electrically connected to the pin 4 of the connector 2 at one end and to the pin 4 of the connector 3 at the other end (connected to both ends of the fourth main transmission path A4) via resistors R47, and is arranged adjacent to the seventh main transmission path A7. Thus, the transmission paths F and A7 are electrically coupled to each other so that the crosstalk is generated therebetween. The amount of crosstalk to be generated here can be adjusted by the resistors R47. Although the fifth coupling transmission path F is branched from the fourth main transmission path A4 and provided adjacent to the seventh main transmission path A7 in this case, the fifth coupling transmission path F may be branched from the seventh main transmission path A7 and provided adjacent to the fourth main transmission path A4.

The sixth coupling transmission path G is electrically connected to the pin 5 of the connector 2 at one end and to the pin 5 of the connector 3 at the other end (connected to both ends of the fifth main transmission path A5) via resistors R52, and is arranged adjacent to the second main transmission path A2. Thus, the transmission paths G and A2 are electrically coupled to each other so that the crosstalk is generated therebetween. The amount of crosstalk to be generated here can be adjusted by the resistors R52. Although the sixth coupling transmission path G is branched from the fifth main transmission path A5 and provided adjacent to the second main transmission path A2 in this case, the sixth coupling transmission path G may be branched from the second main transmission path A2 and provided adjacent to the fifth main transmission path A5.

Electrical length of the main transmission paths A1 to A8 and the coupling transmission paths B1, B2, C1, C2, D, E, F and G is configured to be substantially equal to the sum of electrical length of a transmission path in the input-side connector 2 and that in the output-side connector 3.

Next, a crosstalk reduction method in the present embodiment will be described.

In the connectors 2 and 3 or the signal transmission unit 5, crosstalk caused by, e.g., a signal flowing through No. 6 is considered to reach the maximum in the adjacent No. 5 and No. 7. Based on this, in the present embodiment, the crosstalk caused by the signal flowing through No. 6 is cancelled by intentionally generating crosstalk in No. 5 and No. 7 from No. 3 transmitting a signal with a phase opposite to that of the signal flowing through No. 6, thereby reducing crosstalk.

In detail, in the signal transmission unit 5, the first coupling transmission paths B1 and B2 respectively electrically coupling the third main transmission path A3 to the fifth main transmission path A5 and the third main transmission path A3 to the seventh main transmission path A7 are provided so that a crosstalk signal generated by the signal flowing through the third main transmission path A3 is introduced into the fifth and seventh main transmission paths A5 and A7, thereby cancelling a crosstalk signal which is generated by the signal flowing through the sixth main transmission path A6 and is flowing through the fifth and seventh main transmission paths A5 and A7. The level of the crosstalk signal which is generated by the signal flowing through the third main transmission path A3 and is introduced into the fifth and seventh main transmission paths A5 and A7 can be adjusted by the resistors R53 and R37 and it is possible to reduce crosstalk by appropriately adjusting the resistors R53 and R37.

Likewise, the second coupling transmission paths C1 and C2 respectively electrically coupling the sixth main transmission path A6 to the second main transmission path A2 and the sixth main transmission path A6 to the fourth main transmission path A4 are provided so that a crosstalk signal generated by the signal flowing through the sixth main transmission path A6 is introduced into the second and fourth main transmission paths A2 and A4, thereby cancelling a crosstalk signal which is generated by the signal flowing through the third main transmission path A3 and is flowing through the second and fourth main transmission paths A2 and A4. The level of the crosstalk signal which is generated by the signal flowing through the sixth main transmission path A6 and is introduced into the second and fourth main transmission paths A2 and A4 can be adjusted by the resistors R62 and R46 and it is possible to reduce crosstalk by appropriately adjusting the resistors R62 and R46.

As such, crosstalk in No. 2, No. 4, No. 5 and No. 7 caused by the signals flowing through the No. 3 and No. 6 can be suppressed by providing the coupling transmission paths B1, B2, C1 and C2.

In the present embodiment, the coupling transmission paths D and E are further provided to suppress crosstalk in No. 1 and No. 8 caused by the signals flowing through No. 3 and No. 6.

In detail, in the signal transmission unit 5, the third coupling transmission path D electrically coupling the eighth main transmission path A8 to the third main transmission path A3 is provided so that a crosstalk signal generated by the signal flowing through the third main transmission path A3 is introduced into the eighth main transmission path A8, thereby cancelling a crosstalk signal which is generated by the signal flowing through the sixth main transmission path A6 and is flowing through the eighth main transmission path A8. The level of the crosstalk signal which is generated by the signal flowing through the third main transmission path A3 and is introduced into the eighth main transmission path A8 can be adjusted by the resistors R38 and it is possible to reduce crosstalk by appropriately adjusting the resistors R38.

Likewise, the fourth coupling transmission path E electrically coupling the first main transmission path A1 to the sixth main transmission path A6 is provided so that a crosstalk signal generated by the signal flowing through the sixth main transmission path A6 is introduced into the first main transmission path A1, thereby cancelling a crosstalk signal which is generated by the signal flowing through the third main transmission path A3 and is flowing through the first main transmission path A1. The level of the crosstalk signal which is generated by the signal flowing through the sixth main transmission path A6 and is introduced into the first main transmission path A1 can be adjusted by the resistors R61 and it is possible to reduce crosstalk by appropriately adjusting the resistors R61.

Suppression of crosstalk caused by the signals flowing through No. 3 and No. 6 has been mainly explained above. In the present embodiment, crosstalk caused by signals flowing through No. 4 and No. 5 is also suppressed.

For example, since the coupling transmission path B1 electrically coupling the third main transmission path A3 to the fifth main transmission path A5 is provided, a crosstalk signal generated by the signal flowing through No. 5 can be introduced into the third main transmission path A3 and it is thereby possible to cancel a crosstalk signal which is generated by the signal flowing through the No. 4 and is flowing through the third main transmission path A3.

Likewise, since the coupling transmission path C2 electrically coupling the fourth main transmission path A4 to the sixth main transmission path A6 is provided, a crosstalk signal generated by the signal flowing through No. 4 can be introduced into the sixth main transmission path A6 and it is thereby possible to cancel a crosstalk signal which is generated by the signal flowing through the No. 5 and is flowing through the sixth main transmission path A6.

Furthermore, since the fifth coupling transmission path F electrically coupling the fourth main transmission path A4 to the seventh main transmission path A7 is provided, a crosstalk signal generated by the signal flowing through No. 4 can be introduced into the seventh main transmission path A7 and it is thereby possible to cancel a crosstalk signal which is generated by the signal flowing through the No. 5 and is flowing through the seventh main transmission path A7.

Likewise, since the sixth coupling transmission path G electrically coupling the fifth main transmission path A5 to the second main transmission path A2 is provided, a crosstalk signal generated by the signal flowing through No. 5 can be introduced into the second main transmission path A2 and it is thereby possible to cancel a crosstalk signal which is generated by the signal flowing through the No. 4 and is flowing through the second main transmission path A2.

As described above, in the crosstalk reduction method of the present embodiment, the first coupling transmission paths B1 and B2 respectively electrically coupling the third main transmission path A3 to the fifth and seventh main transmission paths A5 and A7 located adjacent to the sixth main path A6 and the second coupling transmission paths C1 and C2 respectively electrically coupling the sixth main transmission path A6 to the second and fourth main transmission path A2 and A4 located adjacent to the third main transmission path A3 are provided in the signal transmission unit 5.

Thus, crosstalk is intentionally generated in No. 5 and No. 7 from No. 3 and in No. 2 and No. 4 from No. 6. As a result, crosstalk, which is generated from No. 6 to No. 5 and No. 7 and from No. 3 to No. 2 and No. 4 in the connectors 2 and 3, etc., is cancelled and it is thereby possible to suppress inter-pair crosstalk (Near-End Crosstalk and Far-End Crosstalk).

The invention is not intended to be limited to the embodiment, and it is obvious that the various kinds of changes can be made without departing from the gist of the invention.

For example, although the coupling transmission paths are arranged horizontally adjacent to the main transmission paths (i.e., arranged in the same plane) for electrical coupling in the present embodiment, it is not limited thereto. The coupling transmission paths may be arranged, e.g., vertically adjacent to the main transmission paths.

In addition, a regulator circuit formed of a capacitive element, etc., may be provided on the main transmission paths or the coupling transmission paths even though it is not mentioned in the description of the embodiment.

Furthermore, although the amount of crosstalk is adjusted by the resistors provided on the coupling transmission paths in the present embodiment, it is also possible to adjust the amount of crosstalk by adjusting, e.g., a gap between the adjacently positioned coupling/main transmission paths or a distance between the coupling transmission path and the main transmission path.

Although the repeater 1 in the embodiment is provided with one set of the input-side connector 2, the output-side connector 3 and the signal transmission unit 5, it is not limited thereto. The repeater 1 may be provided with plural sets of the input-side connector 2, the output-side connector 3 and the signal transmission unit 5.

The crosstalk reduction method of the invention is applied to the repeater 1 in the embodiment but is also applicable to general information and communication equipment, in addition to the repeater 1.

What is claimed is:

1. A crosstalk reduction method, comprising:
   in a signal transmission unit comprising first to eighth main transmission paths, pairing the first and second main transmission paths, the third and sixth main transmission paths, the fourth and fifth main transmission paths, and the seventh and eighth main transmission paths respectively to transmit differential signals;
   electrically coupling, by a first coupling transmission path in the signal transmission unit, the third main transmission path to the fifth and seventh main transmission paths that are located adjacent to the sixth main transmission path; and
   electrically coupling, by a second coupling transmission path in the signal transmission unit, the sixth main transmission path to the second and fourth main transmission paths that are located adjacent to the third main transmission path, and
   wherein each end of each coupling transmission path is provided with a resistor, and an amount of crosstalk to be intentionally generated between an adjacent pair of the main transmission paths from another one of the main transmission paths is adjusted by the resistor of said each end of each coupling transmission path, such that the amount of intentionally generated crosstalk transmitting a signal with a phase opposite to that of a respective signal flowing through the another one of the main transmission paths is cancelled.

2. The method according to claim 1, further comprising:
   electrically coupling, by a third coupling transmission path in the signal transmission unit, the third main transmission path to the eighth main transmission path located adjacent to the sixth main transmission path via the seventh main transmission path; and
   electrically coupling, by a fourth coupling transmission path in the signal transmission unit, the sixth main transmission path to the first main transmission path located adjacent to the third main transmission path via the second main transmission path.

3. The method according to claim 2, further comprising:
   electrically coupling, by a fifth coupling transmission path in the signal transmission unit, the fourth main transmission path to the seventh main transmission path; and
   electrically coupling, by a sixth coupling transmission path in the signal transmission unit, the fifth main transmission path to the second main transmission path.

4. The method according to claim 2, wherein both ends of the third coupling transmission path are provided with a resistor of the third coupling transmission path, and are electrically connected to an input side and an output side, respectively, of the third main transmission path via the resistor of the third coupling transmission path.

5. The method according to claim 2, wherein both ends of the fourth coupling transmission path are provided with a resistor of the fourth coupling transmission path, and are electrically connected to an input side and an output side, respectively, of the sixth main transmission path via the resistor of the fourth coupling transmission path.

6. The method according to claim 1, further comprising:
   electrically coupling, by a fifth coupling transmission path in the signal transmission unit, the fourth main transmission path to the seventh main transmission path; and
   electrically coupling, by a sixth coupling transmission path in the signal transmission unit, the fifth main transmission path to the second main transmission path.

7. The method according to claim 6, wherein both ends of the fifth coupling transmission path are provided with a resistor of the fifth coupling transmission path and, are electrically connected to an input side and an output side, respectively, of the fourth main transmission path via the resistor of the fifth coupling transmission path.

8. The method according to claim 6, wherein both ends of the sixth coupling transmission path are provided with a resistor of the sixth coupling transmission path and are electrically connected to an input side and an output side, respectively, of the fifth main transmission path via the resistor of the sixth coupling transmission path.

9. The method according to claim 1, wherein the first main transmission path, the second main transmission path, the third main transmission path, the fourth main transmission path, the fifth main transmission path, the sixth main transmission path, the seventh main transmission path, and the eight main transmission path are consecutively arranged next to each other.

10. The method according to claim 1, wherein the fourth main transmission path and the fifth main transmission path are located adjacent to each other and between the third main transmission path and the sixth main transmission path.

11. A repeater, comprising:
    an input-side connector and an output-side connector each comprising eight pins used such that pins 1 and 2, 3 and 6, 4 and 5, and 7 and 8 are respectively paired to transmit differential signals; and
    a signal transmission unit comprising first to eighth main transmission paths each connecting the pins having a same number at the input-side connector and the output-side connector,
    wherein a communication cable connected to the input-side connector is connected through the repeater to another communication cable connected to the output-side connector,
    wherein the signal transmission unit further comprises a first coupling transmission path adapted to electrically couple the third main transmission path to the fifth and seventh main transmission paths that are located adjacent to the sixth main path, and a second coupling transmission path adapted to electrically couple the sixth main transmission path to the second and fourth main transmission paths that are located adjacent to the third main transmission path, and
    wherein each end of each coupling transmission path is provided with a resistor, and an amount of crosstalk to be intentionally generated between an adjacent pair of the main transmission paths from another one of the main transmission paths is adjusted by the resistor of said each end of each coupling transmission path, such that the amount of intentionally generated crosstalk transmitting a signal with a phase opposite to that of a respective signal flowing through the another one of the main transmission paths is cancelled.

12. The repeater according to claim 11, wherein the signal transmission unit further comprises a third coupling transmission path adapted to electrically couple the third main transmission path to the eighth main transmission path located adjacent to the sixth main transmission path via the seventh main transmission path, and a fourth coupling transmission path adapted to electrically couple the sixth main transmission path to the first main transmission path located adjacent to the third main transmission path via the second main transmission path.

13. The repeater according to claim 12, wherein the signal transmission unit further comprises a fifth coupling transmission path adapted to electrically couple the fourth main transmission path to the seventh main transmission path, and a sixth coupling transmission path adapted to electrically couple the fifth main transmission path to the second main transmission path.

14. The repeater according to claim 12, wherein both ends of the third coupling transmission path are provided with a resistor of the third coupling transmission path, and are electrically connected to the pin 3 of the input-side connector and the output-side connector, respectively, via the resistor of the third coupling transmission path.

15. The repeater according to claim 12, wherein both ends of the fourth coupling transmission path are provided with a resistor of the fourth coupling transmission path, and are electrically connected to the pin 6 of the input-side connector and the output-side connector, respectively, via the resistor of the fourth coupling transmission path.

16. The repeater according to claim 11, wherein the signal transmission unit further comprises a fifth coupling transmission path adapted to electrically couple the fourth main transmission path to the seventh main transmission path, and a sixth coupling transmission path adapted to electrically couple the fifth main transmission path to the second main transmission path.

17. The repeater according to claim 16, wherein both ends of the fifth coupling transmission path are provided with a resistor of the fifth coupling transmission path, and are electrically connected to the pin 4 of the input-side connector and the output-side connector, respectively, via the resistor of the fifth coupling transmission path.

18. The repeater according to claim 16, wherein both ends of the sixth coupling transmission path are provided with a resistor of the sixth coupling transmission path, and are electrically connected to the pin 5 of the input-side connector and the output-side connector, respectively, via the resistor of the sixth coupling transmission path.

19. The repeater according to claim 11, wherein the first main transmission path, the second main transmission path, the third main transmission path, the fourth main transmission path, the fifth main transmission path, the sixth main transmission path, the seventh main transmission path, and the eight main transmission path are consecutively arranged next to each other.

20. The repeater according to claim 11, wherein the fourth main transmission path and the fifth main transmission path are located adjacent to each other and between the third main transmission path and the sixth main transmission path.

* * * * *